(12) United States Patent
Xue et al.

(10) Patent No.: US 12,422,713 B2
(45) Date of Patent: Sep. 23, 2025

(54) BACKLIGHT DIFFUSION PARAMETER GENERATION METHOD, DISPLAY CONTROL METHOD AND APPARATUS, AND DISPLAY APPARATUS

(71) Applicant: BOE Technology Group Co., Ltd., Beijing (CN)

(72) Inventors: Huiling Xue, Beijing (CN); Yifan Hou, Beijing (CN); Shuo Zhang, Beijing (CN); Xiangjun Peng, Beijing (CN); Qiong Wu, Beijing (CN); Xin Duan, Beijing (CN); Wei Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/641,465

(22) Filed: Apr. 22, 2024

(65) Prior Publication Data

US 2024/0319537 A1 Sep. 26, 2024

Related U.S. Application Data

(63) Continuation of application No. PCT/CN2023/083821, filed on Mar. 24, 2023.

(51) Int. Cl.
*G09G 3/34* (2006.01)
*G02F 1/13357* (2006.01)

(52) U.S. Cl.
CPC .. *G02F 1/133606* (2013.01); *G02F 1/133603* (2013.01); *G09G 3/342* (2013.01); *G09G 2330/021* (2013.01); *G09G 2360/16* (2013.01)

(58) Field of Classification Search
CPC ........ G02F 1/133603; G02F 1/133606; G09G 3/342; G09G 3/3426; G09G 2360/16; G09G 2330/021
See application file for complete search history.

(56) References Cited

U.S. PATENT DOCUMENTS 8,982,038 B2 * 3/2015 Higgins ............... G09G 3/3413
345/102
9,412,336 B2 * 8/2016 Bastani .................... G09G 5/10
(Continued)

FOREIGN PATENT DOCUMENTS

CN 101847369 A 9/2010
CN 102930831 A 2/2013
(Continued)

OTHER PUBLICATIONS

International Search Report for PCT/CN2023/083821 Mailed Dec. 25, 2023.
(Continued)

*Primary Examiner* — Olga V Merkoulova
(74) *Attorney, Agent, or Firm* — Ling Wu; Stephen Yang; Ling and Yang Intellectual Property

(57) ABSTRACT

Disclosed is a backlight diffusion parameter generation method, including: selecting and measuring illumination diffusion data of at least one light emitting region in a plurality of light emitting regions, the illumination diffusion data includes brightness data of a plurality of pixels on a display panel and distance data between positions corresponding to the plurality of pixels and a position where an illuminated light emitting region is located when only one of the light emitting regions is illuminated; preprocessing the illumination diffusion data to obtain an effective pixel; performing function fitting according to data corresponding to a plurality of effective pixels to obtain a point spread function representing a relationship between diffusion brightness and a diffusion distance; and storing a backlight diffusion parameter lookup table, which includes a plurality of sub-tables, each sub-table corresponds to one or more light emitting regions affected when only one light emitting region is illuminated.

20 Claims, 11 Drawing Sheets

(56) References Cited

U.S. PATENT DOCUMENTS

| | | | |
|---|---|---|---|
| 10,809,570 B2 * | 10/2020 | Ji | G02F 1/133611 |
| 10,930,225 B2 * | 2/2021 | Ji | G09G 3/3426 |
| 12,062,344 B2 * | 8/2024 | Chang | G09G 3/36 |
| 2012/0287167 A1 | 11/2012 | Higgins et al. | |
| 2015/0022754 A1 * | 1/2015 | Jepsen | G02F 1/133504 |
| | | | 349/61 |
| 2015/0097853 A1 * | 4/2015 | Bastani | G09G 5/10 |
| | | | 345/589 |
| 2015/0153023 A1 * | 6/2015 | Jepsen | F21V 13/08 |
| | | | 362/602 |
| 2019/0206335 A1 * | 7/2019 | Wu | G09G 3/3426 |
| 2019/0353961 A1 * | 11/2019 | Ji | G09G 3/3426 |
| 2019/0355316 A1 * | 11/2019 | Ji | G09G 3/36 |
| 2020/0410945 A1 * | 12/2020 | Ji | G09G 3/3426 |
| 2024/0321225 A1 * | 9/2024 | Xue | G09G 3/2007 |

FOREIGN PATENT DOCUMENTS

| | | |
|---|---|---|
| CN | 103295553 A | 9/2013 |
| CN | 107507580 A | 12/2017 |
| CN | 108648700 A | 10/2018 |
| CN | 108665866 A | 10/2018 |

OTHER PUBLICATIONS

Zhang, Xitiao, "Research on Liquid Crystal Television LED Backlight Direct Region Dimming Algorithm", Information Science & Technology, China Master's Theses Full-Text Database, Jun. 15, 2016.

* cited by examiner

BACKLIGHT DIFFUSION PARAMETER GENERATION METHOD, DISPLAY CONTROL METHOD AND APPARATUS, AND DISPLAY APPARATUS

CROSS-REFERENCE TO RELATED APPLICATION

This application is a continuation of International PCT Application No. PCT/CN2023/083821 filed on Mar. 24, 2023, which is incorporated herein by reference in its entirety.

TECHNICAL FIELD

Embodiments of the present disclosure relate to, but are not limited to, the field of display technologies, in particular to a backlight diffusion parameter generation method, a display control method and apparatus, and a display apparatus.

BACKGROUND

A Liquid Crystal Display (LCD) requires a backlight module to provide a light source to a display panel. In recent years, with enhancement of computing power of controllers and progress of technologies, local dynamic dimming (Local Dimming) is widely used in the field of high-quality display. As shown in FIG. 1A, the local dynamic dimming achieves a same display effect as full-brightness backlight by dimming backlight corresponding to a relatively dark region of a display image and compensating a display signal of the liquid crystal display in display control. The local dynamic dimming may effectively reduce power consumption of a whole machine and improve a contrast ratio of image quality, which is of great significance for mobile devices and super-large display apparatuses.

SUMMARY

The following is a summary of subject matters described herein in detail. The summary is not intended to limit the protection scope of claims.

An embodiment of the present disclosure provides a backlight diffusion parameter generation method used for a display apparatus including a backlight module and a display panel, and the backlight module includes a light emitting plate and an optical membrane group located between the light emitting plate and the display panel; wherein the light emitting plate includes a plurality of light emitting regions, and the display panel includes a plurality of pixels; the backlight diffusion parameter generation method includes: selecting and measuring illumination diffusion data of at least one light emitting region in the plurality of light emitting regions, wherein the illumination diffusion data includes brightness data of the plurality of pixels on the display panel and distance data between positions corresponding to the plurality of pixels and a position where an illuminated light emitting region is located when only one of the light emitting regions is illuminated; preprocessing the illumination diffusion data to obtain an effective pixel; performing function fitting according to data corresponding to a plurality of effective pixels to obtain a point spread function representing a relationship between diffusion brightness and a diffusion distance; and storing a backlight diffusion parameter lookup table, wherein the backlight diffusion parameter lookup table includes a plurality of sub-tables, each sub-table corresponds to one or more light emitting regions affected when only one light emitting region is illuminated, and each sub-table includes a plurality of diffusion distances and diffusion brightness corresponding to each diffusion distance.

Optionally, when only one of the light-emitting regions is illuminated, a quantity of affected light-emitting regions is 4 y, and a quantity of sub-tables is y, wherein y is a natural number greater than or equal to 1.

Optionally, a diffusion distance in each of the sub-tables is represented by a two-dimensional coordinate of a corresponding pixel.

Optionally, diffusion brightness stored in each of the sub-tables is not zero.

Optionally, each of the sub-tables includes a plurality of pixel coordinate bonding points and diffusion brightness corresponding to each pixel coordinate bonding point.

An embodiment of the present disclosure also provides a display control method, including: setting set backlight brightness of each light emitting region according to a gray scale of an image to be displayed; acquiring backlight diffusion parameter of a backlight module of a display apparatus, wherein the backlight diffusion parameter of the backlight module are obtained in advance according to the backlight diffusion parameter generation method as described in any embodiment of the present disclosure and stored in the display apparatus; calculating equivalent backlight brightness of each pixel according to the set backlight brightness of each light emitting region and the backlight diffusion parameter; calculating corresponding compensation data according to the equivalent backlight brightness of each pixel; and controlling the backlight module to illuminate a light emitting region in the set backlight brightness, and controlling a display panel to display the image according to the compensation data.

Optionally, the calculating the equivalent backlight brightness of each pixel according to the set backlight brightness of each light emitting region and the backlight diffusion parameter includes: determining all A*B effective light emitting regions affecting brightness of the pixel, wherein A and B are positive integers; acquiring weights of (A*B−1) effective light emitting regions except a light emitting region where the pixel is located, and calculating a weight sum a of the (A*B−1) effective light emitting regions; calculating a weight b=1−a of the light emitting region where the pixel is located; calculating total diffusion brightness of the A*B effective light emitting regions in the pixel according to diffusion weight data corresponding to the A*B effective light emitting regions and the set backlight brightness; and taking the total diffusion brightness of the A*B effective light emitting regions in the pixel as the equivalent backlight brightness of the pixel.

An embodiment of the present disclosure also provides a display control apparatus, including a memory and a processor connected to the memory, the memory is configured to store instructions, the processor is configured to perform acts of the display control method according to any embodiment of the present disclosure based on the instructions stored in the memory.

An embodiment of the present disclosure also provides a display apparatus, which includes the display control apparatus as described in any embodiment of the present disclosure, a display panel, and a backlight module.

An embodiment of the present disclosure also provides a computer readable storage medium on which a computer program is stored, wherein when the computer program is executed by a processor, the display control method according to any embodiment of the present disclosure is implemented.

Other aspects may be comprehended upon reading and understanding drawings and detailed description.

BRIEF DESCRIPTION OF THE DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1A:
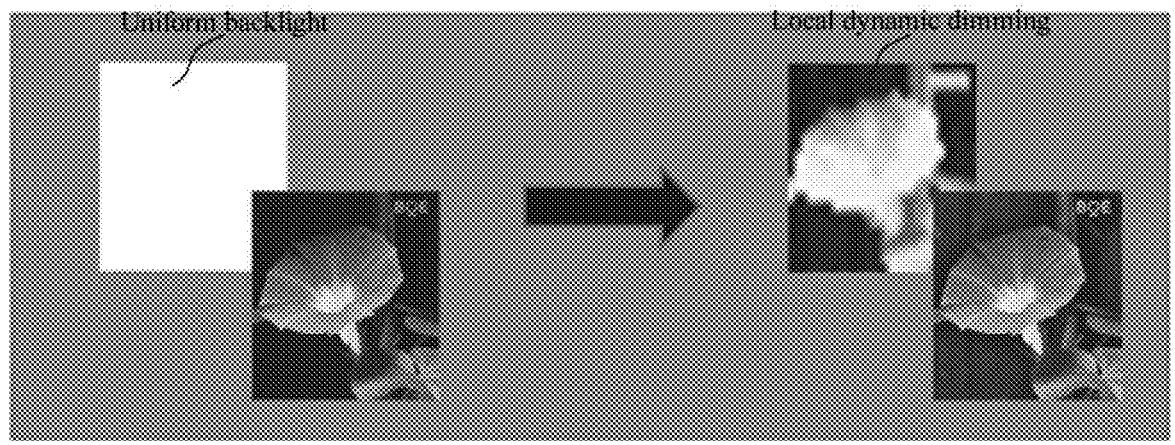
FIG. 1A is a schematic diagram of a principle of a local dynamic dimming technology.

To make objectives, the technical solutions, and advantages of the present disclosure clearer, the embodiments of the present disclosure will be described in detail below in combination with the accompany drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skills in the art to which the present disclosure belongs. "First", "second", and similar words used in the embodiments of the present disclosure do not represent any order, quantity, or importance, but are only used for distinguishing different components. "Include", "contain", or a similar word means that an element or article appearing before the word covers an element or article and equivalent thereof listed after the word, and other elements or articles are not excluded.

A Mini-Light Emitting Diode (Mini LED) technology refers to inorganic light emitting diodes with a light emitting chip area size of 100 μm to 200 μm. A Mini LED inherits characteristics of an inorganic LED, such as high efficiency, high brightness, high reliability, and fast response time, and has characteristics of self-luminescence without a light emitting element, which has advantages of energy saving, simple mechanism, small volume, and thin shape; it has advantages of longer light emitting life, higher brightness, better material stability, no image branding, etc., and when it is applied to a liquid crystal display apparatus, multi-partition region dimming may be achieved, and by adjusting different brightness of each partition, backlight power consumption is reduced and a picture contrast ratio is improved.

A display apparatus includes a backlight module and a display panel, and the backlight module includes a light emitting plate and an optical membrane group located between the light emitting plate and the display panel; wherein the light emitting plate includes a plurality of light emitting regions, and the optical membrane group at least includes a prism sheet, a diffuser sheet, a polarizer, etc. In the related art, in a process of displaying a picture by a display apparatus, firstly, brightness required by each light emitting region is set according to a gray scale of a displayed image, and each pixel in a display panel controls a rotation angle of liquid crystal molecules in a region where the pixel is located according to the obtained brightness. As shown in FIGS. 1B to 1F, a light emitting plate 100 is disposed opposite to a display panel, and dimensions of their opposite surfaces are equivalent; the light emitting plate may be divided into several light emitting regions 111, for example, M*N light emitting regions are arranged in an array, and both M and N are not more than the order of magnitude of $10^2$; a pixel resolution of the display panel is W*H, that is, W*H pixel arrays are arranged, and both W and H are at least in the order of magnitude of $10^3$, so a resolution of a light emitting region is generally much smaller than the pixel resolution of the display panel.

Figure 1B:
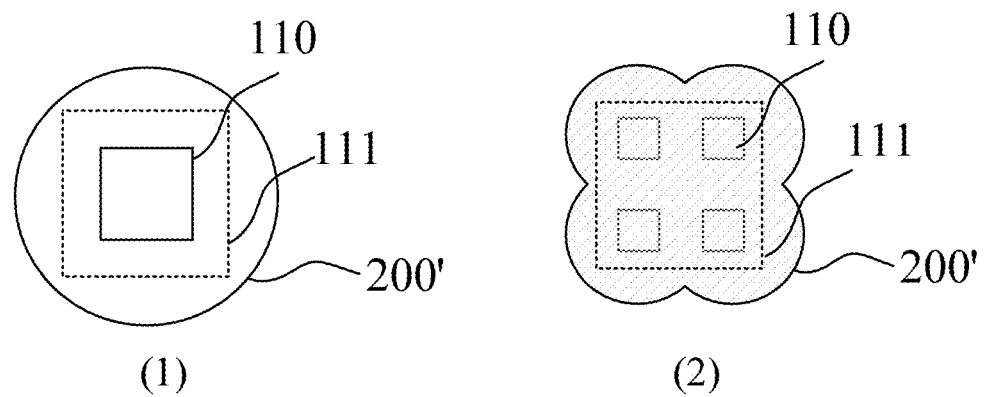
FIG. 1B is a schematic diagram of a light emitting range of a single light emitting region itself which has not been modulated by an optical membrane group.

Each of the light emitting regions 111 includes at least one light emitting element 110 which may be achieved by a Mini LED or any form of light emitting device. Each light emitting element may be equivalent to a point light source or a cosine light emitting body. If a single light emitting region includes only one Mini LED, as shown in FIG. 1B (1), a light emitting range 200' of the light emitting region itself which has not been modulated by an optical membrane group is substantially circular; and if a single light emitting region includes 2*2 Mini LEDs, as shown in FIG. 1B (2), a light emitting range 200' of the light emitting region itself which has not been modulated by an optical membrane group is similar to a petal shape. However, light emitted from the light emitting region needs to be modulated by the optical membrane group before it is incident on a plurality of pixels of a display panel, that is, the light emitting range 200' of the light emitting region itself will be modulated into a diffusion range 200. A diffusion range of a light emitting region is affected by many factors, such as a size of a light emitting element, a light emitting angle of the light emitting element, an arrangement position of the light emitting element in the light emitting region, and characteristics of each optical film material in the optical membrane group. However, for a certain type of display apparatus, a same function may be adopted to describe characteristics of backlight in the display apparatus of a same type once a type of a light emitting element, an arrangement position, a material and characteristics of an optical membrane group, etc. are determined.

Figure 1C:
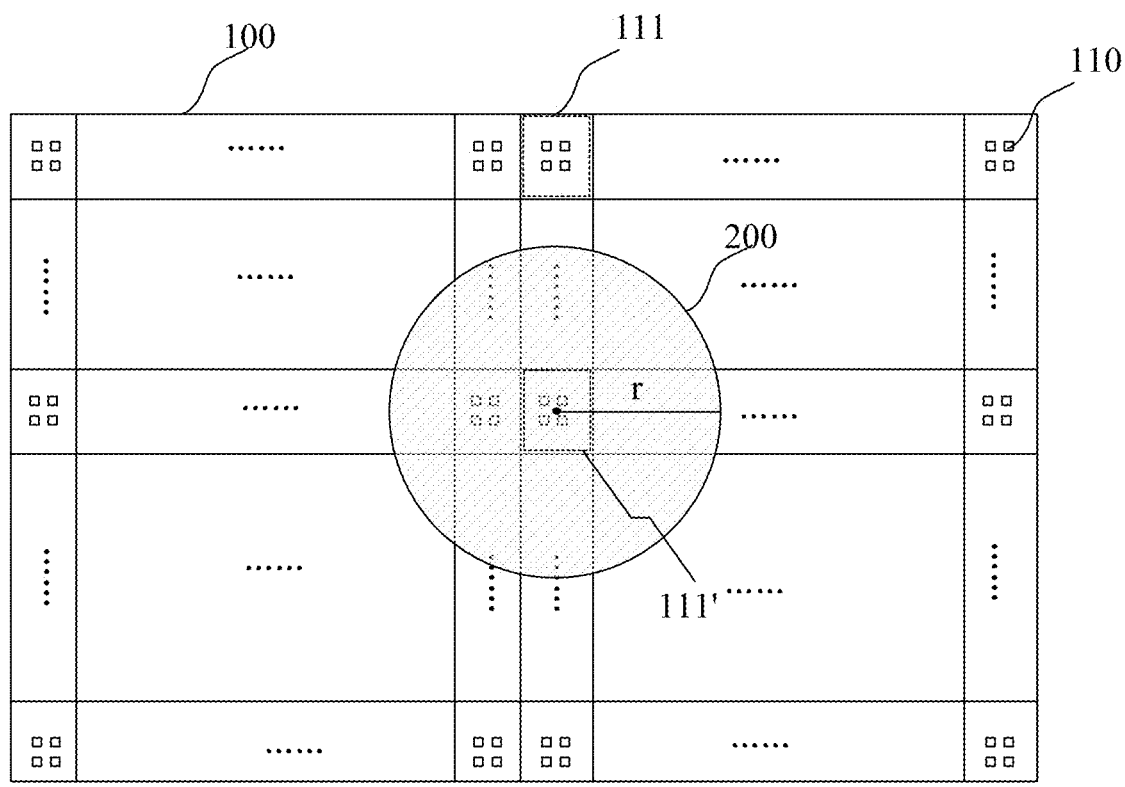
FIG. 1C is a schematic diagram of a diffusion range when a single light emitting region includes 2*2 Mini Light Emitting Diodes (LEDs) after being modulated by an optical membrane group.
Figure 1D:
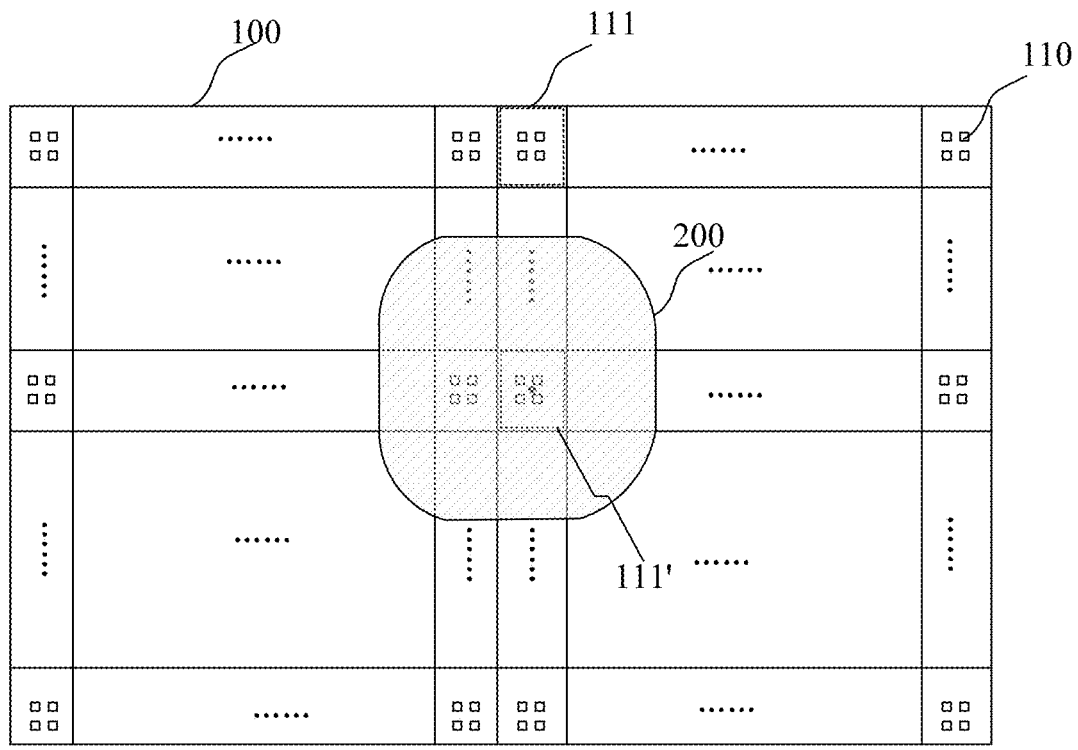
FIG. 1D is a schematic diagram of another diffusion range when a single light emitting region includes 2*2 Mini LEDs after being modulated by an optical membrane group.
Figure 1E:
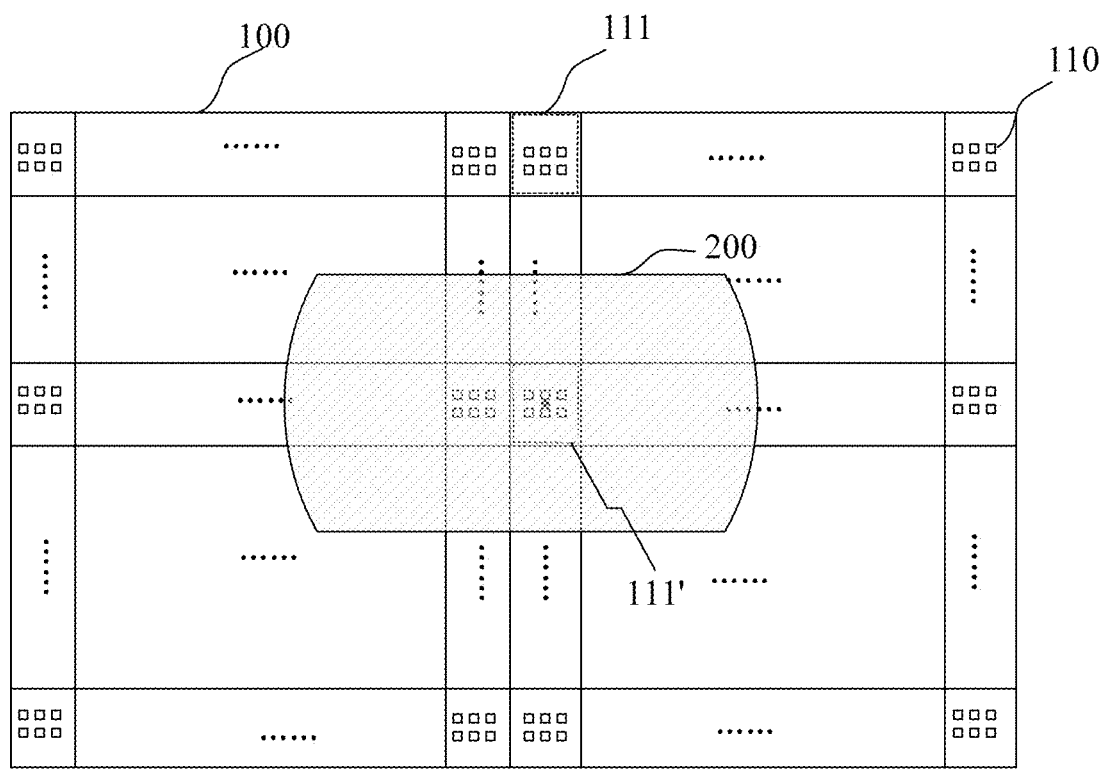
FIG. 1E is a schematic diagram of a diffusion range when a single light emitting region includes 3*2 Mini LEDs after being modulated by an optical membrane group.
Figure 1F:
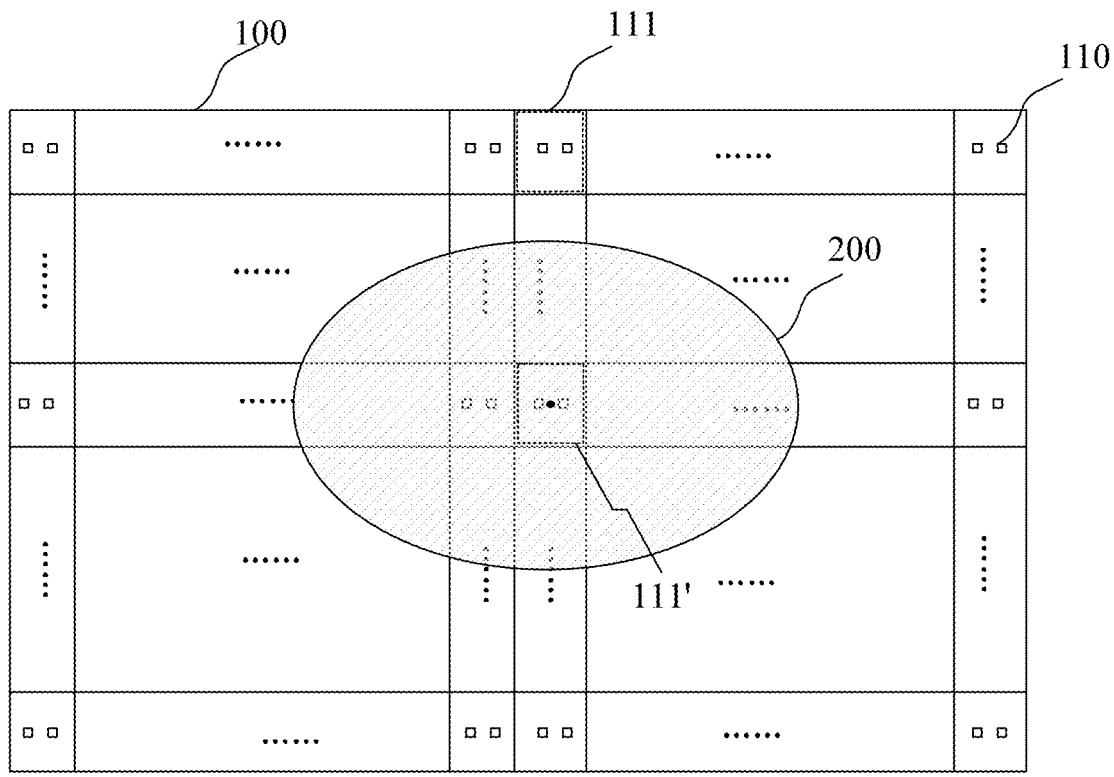
FIG. 1F is a schematic diagram of a diffusion range when a single light emitting region includes 2*1 Mini LEDs after being modulated by an optical membrane group.

In a case where a plurality of light emitting elements of a same type are disposed in each light emitting region and all the light emitting elements are centrally symmetrically arranged, a contour shape of a diffusion range 200 obtained by modulating light emitted from a single light emitting region by an optical membrane group may be, for example, a circle with a radius r as shown in FIG. 1C or a rounded rectangle as shown in FIG. 1D. Herein, in FIGS. 1B and 1C, each light emitting region includes light emitting elements 110 arranged in a 2*2 array. In a case where a plurality of light emitting elements of a same type are disposed in each light emitting region and all the light emitting elements are arranged axially symmetrically rather than centrally symmetrically, a contour shape of a diffusion range 200 obtained by modulating light emitted from a single light emitting region by an optical membrane group may be, for example, a shape shown in FIG. 1E or an ellipse as shown in FIG. 1F. Herein, in FIG. 1E, each light emitting region includes light emitting elements 110 arranged in a 3*2 array; and in FIG. 1F, each light emitting region includes light emitting elements 110 arranged in a 2*1 array.

The shape of the diffusion range in the above drawings is only for convenience of illustrating the principle of the embodiments of the present disclosure and is not intended to limit the diffusion range of the light emitting region. Under teaching of the present disclosure, those skilled in the art may achieve acquisition and calculation of a point spread function of an elliptical or other shaped light emitting region without going beyond the scope of the present disclosure.

An intensity of a single light emitting element will be attenuated with the increase of a diffusion distance, and a degree of attenuation is basically isotropic. Similarly, an intensity of a single light emitting region will also be attenuated with the increase of the diffusion distance. From a physical position relationship, a region where one light emitting region is located corresponds to a region where several pixels are located, so backlight brightness received by different pixels corresponding to a same partition is different; and considering that light emitted from the light emitting region has a diffusion range after being modulated by an optical membrane group, a same pixel will be affected by light emitted from different light emitting regions.

Figure 2:
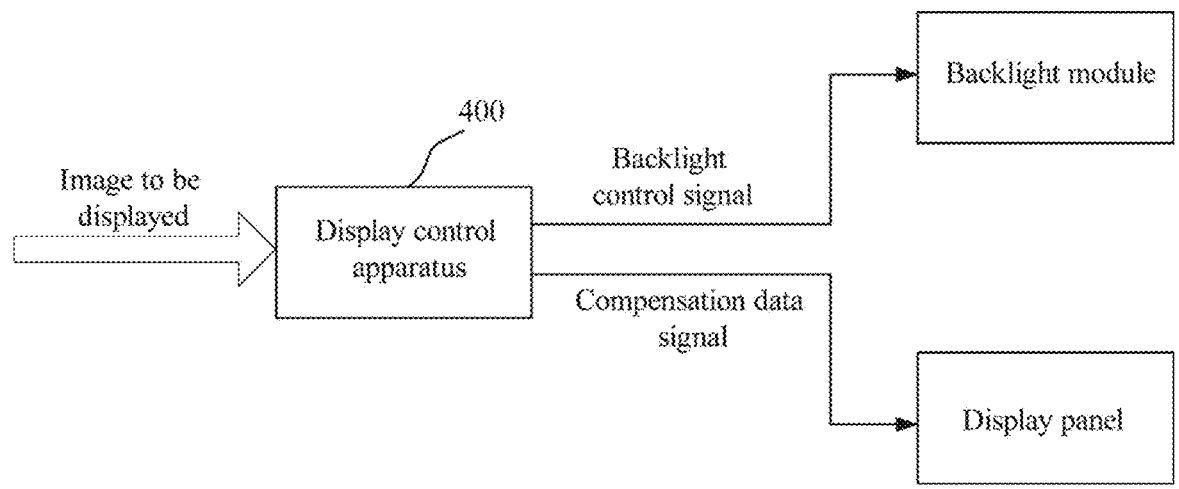
FIG. 2 is a schematic diagram of a display control principle according to an embodiment of the present disclosure.

FIG. 2 is a schematic diagram of a display control principle of local dynamic dimming according to an embodiment of the present disclosure. When local dynamic dimming is performed, a display control device 400 generates a backlight control signal and a display panel control signal respectively after receiving an image to be displayed. The backlight control signal may be generated according to gray scale distribution characteristics of the image to be displayed, so as to control different light emitting regions to show different brightness. After backlight brightness of a local region is changed, correspondingly, compensation data is input into the display panel control signal to accurately achieve a target display effect. In this compensation process, it is necessary to consider change of backlight brightness of each pixel relative to static high-brightness backlight after backlight change.

Backlight obtained by each pixel comes not only from a light emitting region at its opposite position, but also from an adjacent light emitting region. However, brightness diffusion of each light emitting region presents very complex nonlinear characteristics. If a backlight diffusion parameter cannot be accurately modeled and an influence of a surrounding light emitting region on brightness is ignored, appropriate compensation data cannot be obtained, which directly affects final display quality adversely. This is one of main reasons why a dynamic dimming display effect is not ideal in related technologies. In order to solve this problem, an embodiment of the present disclosure provides a method for generating a backlight diffusion parameter, and in the method, a point spread function is used for modelling the backlight diffusion parameter and solves model parameters through a backlight illumination experiment. On this basis, equivalent backlight brightness of W*H pixels after diffusion is calculated according to backlight diffusion parameters of M*N partitions, and compensation data is obtained accordingly.

In the embodiment of the present disclosure, the compensation data refers to a compensated gray scale value of each pixel of the display panel. In some exemplary embodiments, the compensated gray scale value of each pixel may be determined in a following manner.

A compensation rate of each pixel on the display panel is calculated, and the compensation rate $S=(Lmax/Lnew)^{(1/gamma)}$, wherein Lmax is an original backlight brightness value of the pixel, Lnew is an equivalent backlight brightness value of the pixel obtained by calculating, gamma is a gamma value of the display panel, and ^ is a power exponent operation; and the compensated gray scale value of each pixel is determined, and the compensated gray scale value $Gnew=Gori*S$, wherein Gori is an original gray scale value of the pixel.

In the present disclosure, the backlight diffusion parameter includes a parameter for describing a diffusion range of a light emitting region, for example, the backlight diffusion parameter may include diffusion brightness corresponding to different diffusion distances when only one light emitting region is illuminated; and further, the backlight diffusion parameter may also include, for a single pixel, all A*B effective light emitting regions affecting brightness of the pixel and diffusion weight data corresponding to each effective light emitting region. In the present disclosure, an effective light emitting region of a pixel refers to all light emitting regions that affect brightness of the pixel.

Change of brightness of a light emitting region with a diffusion distance may be described by using a Point Spread Function (PSF). In an optical system, the point spread function may be used for describing a light field distribution of an output image when an input object is a point light source. In the method according to the present disclosure, a backlight diffusion weight is calculated based on a diffusion distance to simulate a diffusion situation of a light emitting region. By illuminating a single light emitting region for many times and processing data of a display panel, a diffusion range of a light emitting region is obtained, and diffusion weights of different distances corresponding to a center of the light emitting region are accurately obtained. Therefore, in subsequent display control, equivalent backlight brightness corresponding to each pixel may be calculated according to the diffusion weights, and then accurate compensation data may be obtained according to a brightness equivalence relationship, etc.

The method and the apparatus according to the embodiments of the present disclosure will be described in detail below with reference to the accompanying drawings.

Figure 3:
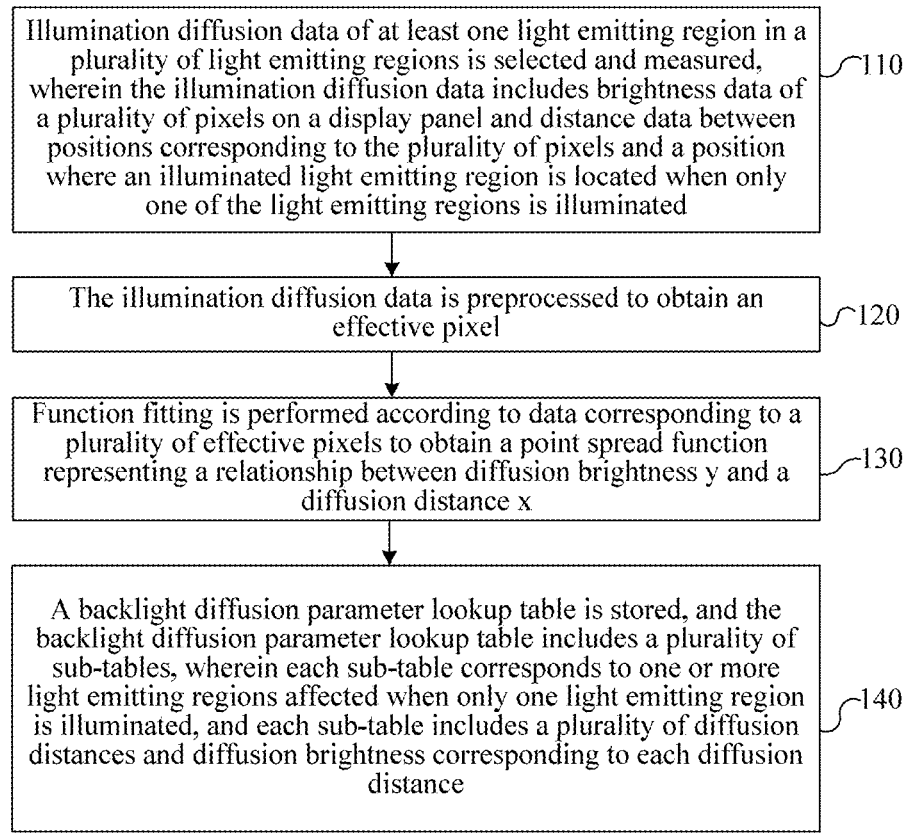
FIG. 3 is a schematic flowchart of a backlight diffusion parameter generation method according to an embodiment of the present disclosure.

FIG. 3 is a schematic flowchart of a backlight diffusion parameter generation method according to an embodiment of the present disclosure. Herein, the backlight diffusion parameter generation method is used for a display apparatus including a backlight module and a display panel, and the backlight module includes a light emitting plate and an optical membrane group located between the light emitting plate and the display panel; wherein the light emitting plate includes a plurality of light emitting regions, and the display panel includes a plurality of pixels; the backlight diffusion parameter generation method includes the following acts.

In act 110, illumination diffusion data of at least one light emitting region in the plurality of light emitting regions is selected and measured, wherein the illumination diffusion data includes brightness data of a plurality of pixels on the display panel and distance data between positions corresponding to the plurality of pixels and a position where the illuminated light emitting region is located when only one of the light emitting regions is illuminated.

In act 120, the illumination diffusion data is preprocessed to obtain an effective pixel.

In act 130, function fitting is performed according to data corresponding to a plurality of effective pixels to obtain a point spread function representing a relationship between diffusion brightness y and a diffusion distance x.

In act 140, a backlight diffusion parameter lookup table is stored, and the backlight diffusion parameter lookup table includes a plurality of sub-tables, wherein each sub-table corresponds to one or more light emitting regions affected when only one light emitting region is illuminated, and each sub-table includes a plurality of diffusion distances and diffusion brightness corresponding to each diffusion distance.

In the embodiment of the present disclosure, when illuminating a certain light emitting region and collecting brightness data of a plurality of pixels on the display panel, a deflection degree of a liquid crystal at a position corresponding to each pixel on the display panel needs to be controlled to be the same, for example, a liquid crystal cell in the display panel may make all light emitted from a single light emitting region and adjusted by an optical membrane group pass through; and when describing distance data between positions corresponding to a plurality of pixels and a position where an illuminated light emitting region is located, a distance between an orthographic projection of a position where a center of a pixel is located on the display panel and an orthographic projection of a position where a center of a light emitting region is located on the display panel may be taken as a distance between a position corresponding to the pixel and a position where the light emitting region is located.

In the embodiment of the present disclosure, when a light emitting region is illuminated separately, a pixel falling into a diffusion range of the light emitting region is called an effective pixel corresponding to the light emitting region.

In the backlight diffusion parameter generation method according to the embodiment of the present disclosure, a backlight diffusion parameter lookup table is divided into a plurality of sub-tables, each sub-table corresponds to one or more light emitting regions affected when only a certain light emitting region is illuminated, and each sub-table includes a plurality of diffusion distances and diffusion brightness corresponding to each diffusion distance, which greatly reduces a quantity of bits of a diffusion distance stored in the backlight diffusion parameter lookup table, thereby greatly reducing hardware requirements for storage.

In some exemplary implementation modes, in the act 110, a plurality of light emitting regions of different regions of the display apparatus may be selected, and light diffusion data of each light emitting region may be measured respectively, wherein the light diffusion data includes brightness data of a plurality of pixels on the display panel when each light emitting region is individually illuminated and distance data between a position corresponding to each pixel and a position where the illuminated light emitting region is located. Herein, the position corresponding to the pixel may be described by a coordinate position of the pixel on the display panel, and the position which the light emitting region is located may be described by a coordinate position corresponding to an orthographic projection of a geometric center of the light emitting region on the display panel.

Figure 4A:
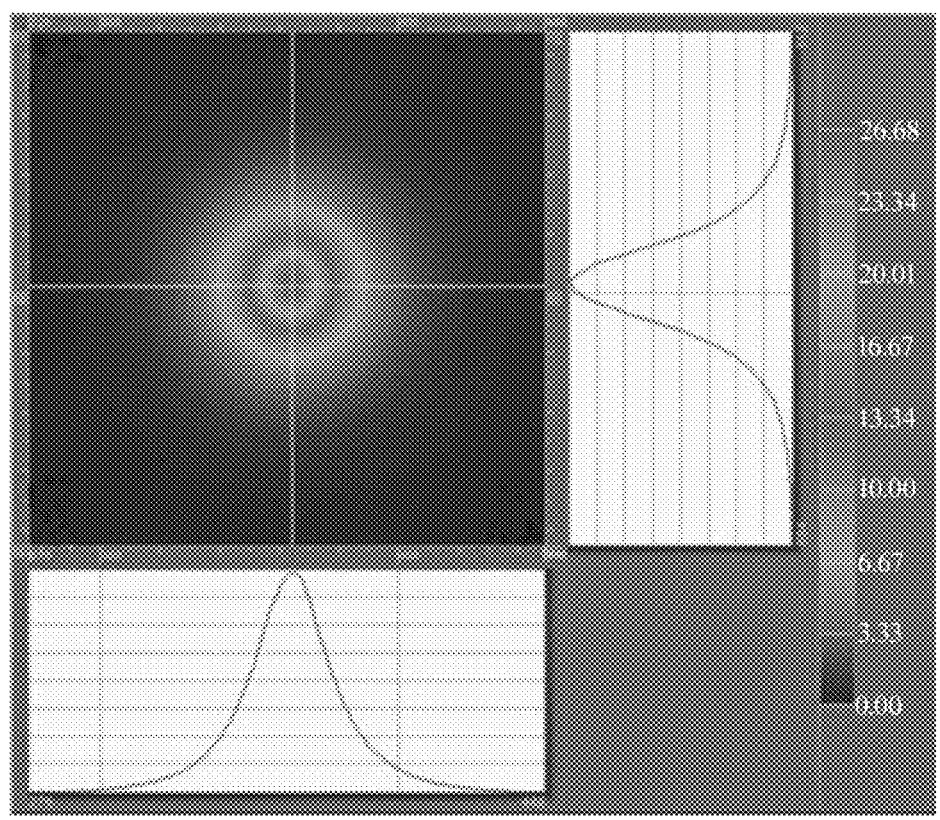
FIG. 4A is a schematic diagram of a software interface of a brightness acquisition apparatus for acquiring brightness data according to an embodiment of the present disclosure.

Measurement of brightness may be achieved by using a variety of brightness measuring apparatuses, for example, a two-dimensional color analyzer CA-S25w may be used. For example, FIG. 4A is a schematic diagram of a software interface of a two-dimensional color analyzer CA-S25w when acquiring brightness data according to an embodiment of the present disclosure. By photographing a light emitting surface of the display panel, a maximum diffusion distance and a diffusion intensity of a light emitting region (i.e., change of e diffusion brightness with a diffusion distance) may be obtained according to a photographing result. When measuring light diffusion data, it is necessary to control a liquid crystal cell of the display panel so that all light emitted from a single light emitting region and adjusted by an optical membrane group can pass through.

As shown in FIG. 4A, usually, light emitted by a single Mini LED has a same diffusion law in all directions and a light intensity of a single Mini LED presents an approximately two-dimensional Gaussian distribution in any direction. Therefore, in some exemplary implementation modes, one-dimensional diffusion laws of two directions parallel to a plane where the display panel is located respectively and perpendicular to each other may be obtained and analyzed, and then a two-dimensional diffusion law of a single Mini LED parallel to the plane where the display panel is located may be obtained by superposition.

In order for the obtained data to better reflect an overall situation of each position of the display panel, in some embodiments, selected multiple light emitting regions may include light emitting regions located at middle, upper left, upper right, lower left, and lower right positions of the display apparatus. For example, light emitting regions at the above specific positions may be selected for measurement. Obviously, it is also possible to select other positions or different numbers of multiple light emitting regions for measurement. The more the number of light emitting regions measured, the more comprehensive the diffusion range of light emitting regions at different positions may be reflected; and accordingly, a required number of experiments and a calculation amount of data processing will also increase, so it may be flexibly selected according to actual needs, and even all the light emitting regions may be lit one by one for measurement.

When describing a diffusion distance, it may be described according to a distance between a position corresponding to the pixel and a position where the light emitting region is located (when calculating a distance between the position corresponding to the pixel and the position where the light emitting region is located, a distance between an orthographic projection of a position where a center of the pixel is located on the display panel and an orthographic projection of a position where a center of the light emitting region is located on the display panel may be taken as the distance between the position corresponding to the pixel and the position where the light emitting region is located). In addition, when describing the diffusion distance, a distance between centers of two adjacent pixels may be taken as a unit length, for example, the diffusion distance is 5, which means that a distance between a position corresponding to the center of the pixel and a position where the center of the light emitting region is located is 5 unit lengths. Thus, when collecting illumination diffusion data of the position corresponding to the pixel, in order to conveniently calculate distance data between the position corresponding to the pixel and a position where an illuminated light emitting region is located, a pixel, for which a distance between its corresponding position and the position where the illuminated light emitting region is located is an integer, may be selected to collect data. For example, when a certain light emitting region is individually illuminated, brightness data of a plurality of pixels on the display panel and distance data between positions corresponding to the plurality of pixels and a position where the illuminated light emitting region is located may include: diffusion brightness and diffusion distance data of a plurality of pixels located at a plurality of different distances in horizontal and vertical directions of the position where the illuminated light emitting region is located. Of course, it is also possible to select pixels at other positions. For example, each pixel in both horizontal and vertical directions may be selected, or a certain number of pixels may be selected at intervals, etc.

The present disclosure uses the light emitting range of the light emitting element after passing through the optical membrane group for modeling, which make each pixel obtain a more accurate equivalent backlight brightness value, thereby making compensation data more reasonable, avoiding loss of details on an image and having a better visual effect.

In some exemplary implementation modes, in the act 120, preprocessing the illumination diffusion data may include: normalizing the illumination diffusion data.

Since different test instruments have different sensitivity to minimum brightness, an influence of different test instruments on test results may be eliminated by normalizing the illumination diffusion data. After normalization, diffusion brightness corresponding to each diffusion distance may also be called a backlight diffusion weight.

In some exemplary implementation modes, in the act 120, preprocessing the illumination diffusion data may include: correcting abnormal data points.

The abnormal data points may be detected according to a preset abnormal detection standard, for example, data points with sudden changes in diffusion brightness as diffusion distance increases may be regarded as abnormal data points. By correcting the abnormal data points, an influence of abnormal data points caused by stains and dust on the test results may be eliminated.

Figure 4B:
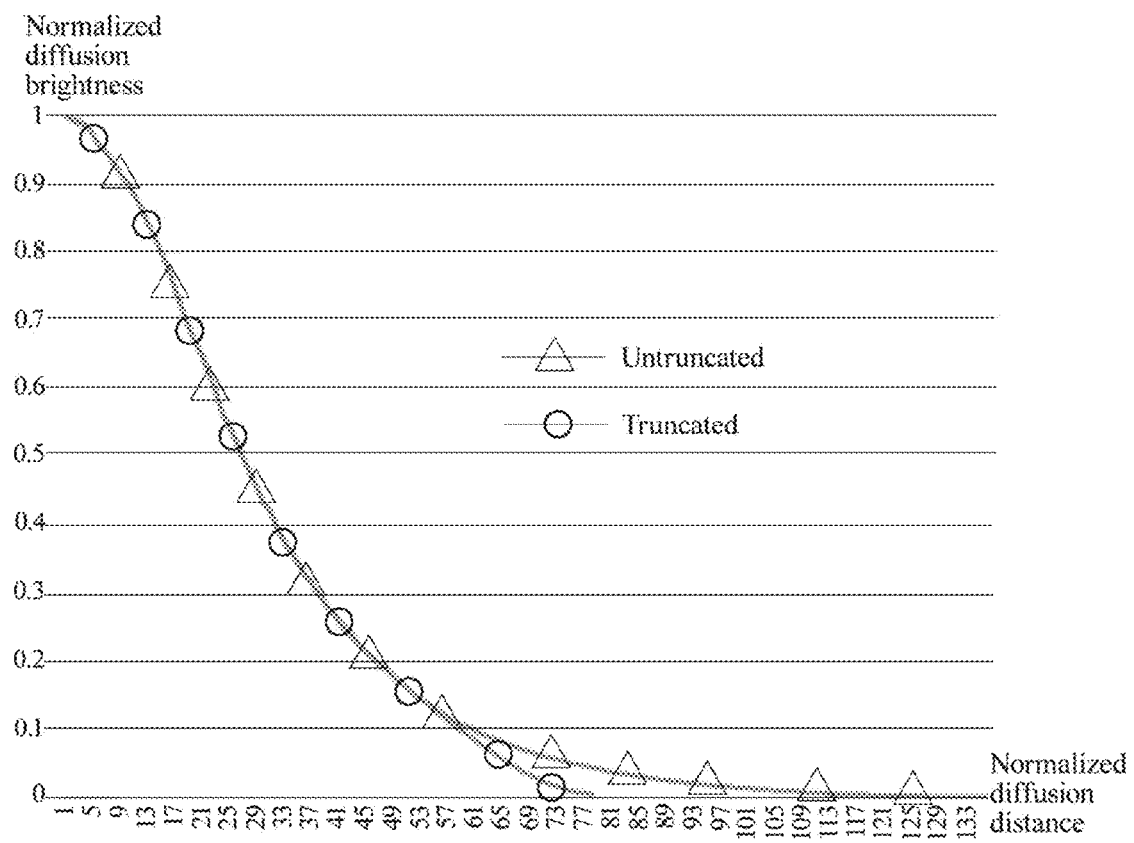
FIG. 4B is a schematic diagram of comparison between untruncated data and truncated data according to an embodiment of the present disclosure.

According to a principle of light diffusion, light emitting brightness of a light emitting region is inversely correlated with a diffusion distance, and with increase of the diffusion distance, a change trend of the diffusion brightness tends to be flat, so that relatively low diffusion brightness corresponds to a relatively long diffusion distance, as shown in FIG. 4B, wherein a horizontal axis is a normalized diffusion distance (taking a distance between centers of two adjacent pixels as one unit length), and a vertical axis is normalized diffusion brightness (dimensionless).

In some exemplary implementation modes, in the act 120, preprocessing the illumination diffusion data may include: truncating the illumination diffusion data and normalizing the truncated data.

For hardware processors, such as a Field Programmable Gate Array (FPGA), a Digital Signal (DSP), a Programmable Logic Array (PLA), they are good at simple logic operations and operations such as weight index and cyclic traversal will greatly increase a difficulty of operation and hardware overhead. Therefore, a data truncation operation will reduce overhead of storage media and hardware operation media, which improves calculation efficiency of a backlight diffusion module and saves resource consumption of hardware.

When truncation is performed, a diffusion range of a light emitting region may be acquired, and a pixel in the diffusion range is an effective pixel. The diffusion range may be illumination diffusion data of diffusion brightness within a preset brightness threshold range, and exemplarily, the preset brightness threshold range may be between 95% and 99% of brightness at a center of the light emitting region. For example, when the preset brightness threshold is 95% of the brightness at the center of the light emitting region, illumination diffusion data lower than 5% of the brightness at the center of the light emitting region are truncated; when the preset brightness threshold value is 97% of the brightness at the center of the light emitting region, illumination diffusion data lower than 3% of the brightness at the center of the light emitting region is truncated; and when the preset brightness threshold is 99% of the brightness at the center of the light emitting region, illumination diffusion data lower than 1% of the brightness at the center of the light emitting region is truncated. With increase of a light source distance, diffusion brightness will attenuate, and when attenuation reaches a certain degree, an influence on total brightness will be minimal. In order to reduce a calculation amount, data whose diffusion brightness attenuates beyond a range smaller than the preset brightness threshold range may be removed, thus obtaining a diffusion range of a single light emitting region. Moreover, for data whose brightness is too low and distance is far away from a light source, a relative error of its brightness measurement will increase, and these data are used for subsequent function fitting, which will lead to very inaccurate fitting results and bring large errors.

Figure 5:
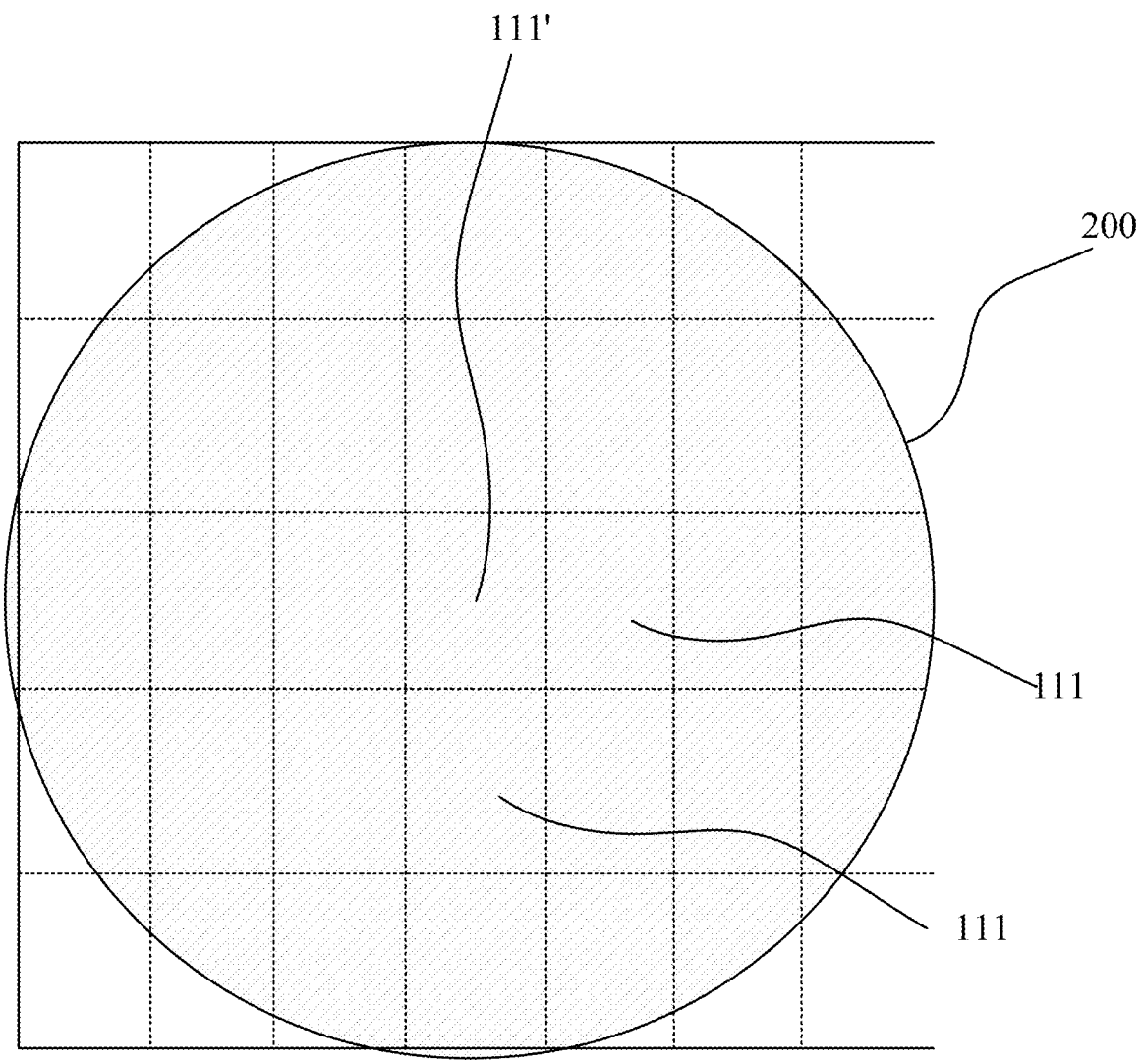
FIG. 5 is a schematic diagram of a diffusion range of a single light emitting region according to an embodiment of the present disclosure.

Referring to FIG. 5, FIG. 5 is a schematic diagram of a diffusion range of a single light emitting region according to an embodiment of the present disclosure. Herein, a diffusion range 200 of a light emitting region 111' affects seven light emitting regions 111 in a horizontal direction and five light emitting regions 111 in a vertical direction. In the embodiment, a diffusion range of each light emitting region in different directions is different, that is, the light emitting region may cover different numbers of light emitting regions in different directions.

In the act 130, the brightness y of the pixel is set as the diffusion brightness, and the distance x between a position corresponding to the pixel and a position of the illuminated light emitting region is located is set as the diffusion distance, and a point spread function $y=f(x)$ representing a relationship between the diffusion brightness y and the diffusion distance x is established.

In some exemplary implementation modes, in the act 130, the obtained point spread function is a function model of at least one of following: Gaussian function model:

$$f(x) = \sum_{n=1}^{\infty} a_n * e^{-\frac{(x-b_n)^2}{c_n}};$$

Sine function model: $f(x)=\sum_{n=1}^{\infty} a_n *\sin(b_n *x+c_n)$; Fourier function model: $f(x)=a_0+\sum_{n=1}^{\infty}(a_n \cos(n*w*x)+b_n \sin(n*w*x))$; wherein n is an order, $a_n$, $b_n$, $c_n$, and w are coefficients, x is a diffusion distance, and f(x) is diffusion brightness.

The present disclosure establishes three point diffusion models, namely, a Gaussian function model, a sine function model, and a Fourier function model. The three function models and their corresponding fitting formulas can obtain enough small fitting errors and are closer to an actual light diffusion situation of a light emitting element. The present disclosure proposes the three point diffusion models, an actual diffusion law is benchmarked with a theoretical model, so that backlight diffusion calculation is more accurate and a risk of detail loss in liquid crystal display is reduced.

In some exemplary implementation modes, functional fitting is performed according to data corresponding to each effective pixel to obtain each parameter in a point spread function, and the obtained point spread function may be used as a backlight diffusion parameter.

In some exemplary implementation modes, in order to obtain a more accurate result, function fitting is performed according to data of each effective pixel to obtain each parameter in the point spread function, which may include: performing statistical analysis on the data of each effective pixel to obtain an average value of diffusion brightness corresponding to each diffusion distance as average diffusion brightness of the diffusion distance; and performing function fitting according to a relationship between a corresponding diffusion distance and the average diffusion brightness to obtain each parameter in the point spread function.

Figure 6:
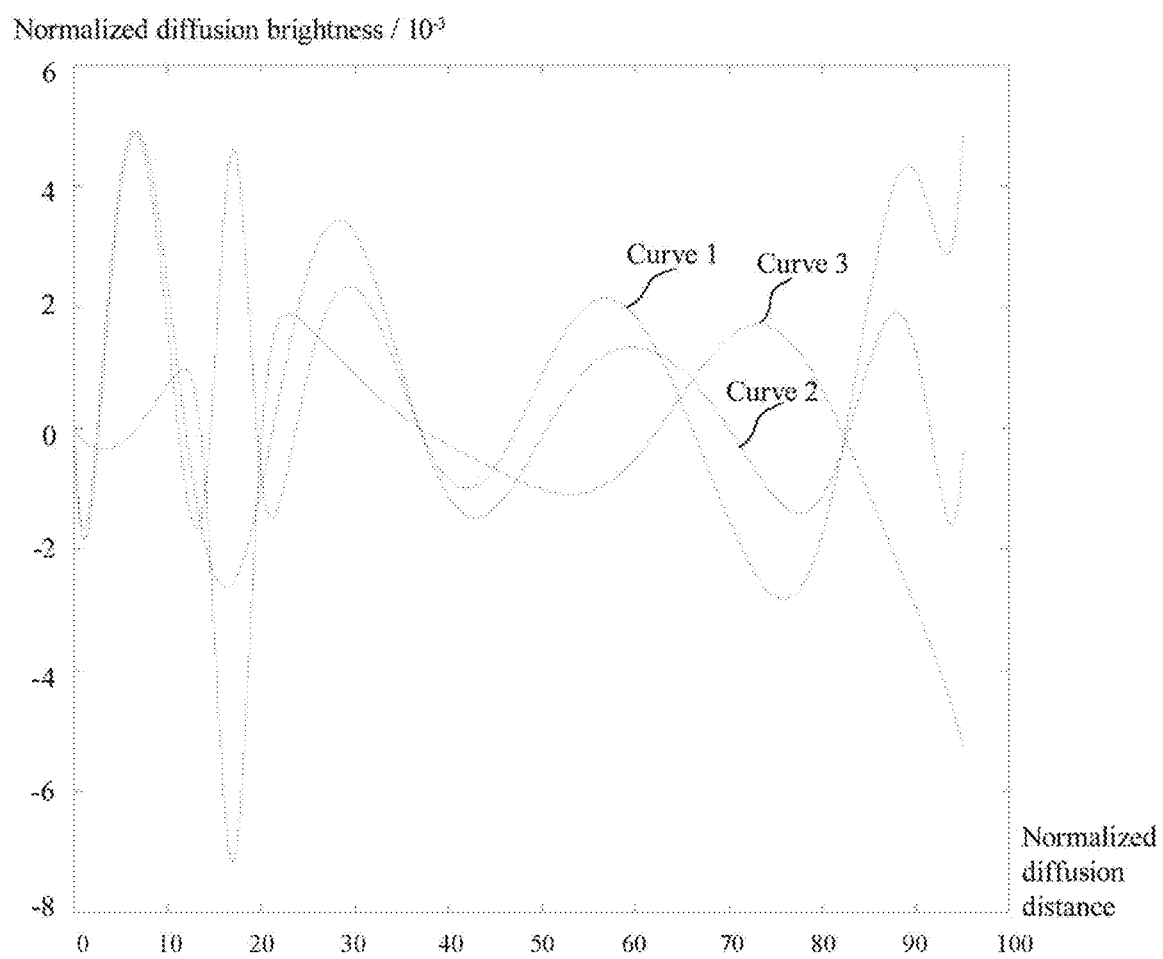
FIG. 6 is a schematic diagram of curve fitting results of three function models according to an embodiment of the present disclosure.

In one embodiment, light emitting regions at five specific positions may be selected, and data of brightness changing with distance in horizontal and vertical directions is collected for each light emitting region, so that a total of 10 sets of illumination diffusion data may be obtained. Theoretically, diffusion of the light emitting region is basically isotropic in each direction of a two-dimensional plane, and analysis of experimental data also shows that a relationship that diffusion brightness changes with distance in the horizontal and vertical directions is basically the same. Therefore, five sets of data in one direction may be selected as data for analysis. In order to eliminate a random error, the five sets of data used for analysis are averaged, and average diffusion brightness corresponding to each diffusion distance may be obtained, and used as data to be fitted. A corresponding point spread function may be obtained by performing curve fitting of y=f(x) according to the data to be fitted. Although light diffuses smoothly in theory, interference of a device and external light in a measurement process will cause certain interference to measurement data, and the data has certain fluctuations. Some algorithms in related technologies may be used for performing curve fitting, or tool software may be directly used for processing data, for example, matlab, mathematica, and other software may be used for achieving function fitting. As shown in FIG. 6, a horizontal axis is a normalized diffusion distance (taking a distance between centers of two adjacent pixels as a unit length), a vertical axis is a difference of normalized diffusion brightness, and each curve represents a difference function of two point spread functions obtained by performing function fitting using two of the above three function models, for example, Curve 1 represents a difference function which is obtained by a difference between a point spread function obtained by performing function fitting using a Gaussian function model and a point spread function obtained by performing function fitting using a Fourier function model, Curve 2 represents a difference function which is obtained by a difference between a point spread function obtained by performing function fitting using a sine function model and a point spread function obtained by performing function fitting using a Fourier function model, and Curve 3 represents a difference function which is obtained by a difference between the point spread function obtained by performing function fitting using the sine function model and the point spread function obtained by performing function fitting using the Gaussian function model. As may be seen from FIG. 6, a difference between point spread functions obtained by performing function fitting through the above three function models is very small. All the three function models provided by the embodiment of the present disclosure can reasonably fit characteristics of data, and fitting results are more in line with a data diffusion law between diffusion distances and diffusion brightness.

When calculating diffusion brightness, it is necessary to index by diffusion distance. Usually, it is necessary to calculate a distance between a pixel and each illuminated light emitting region, and the distance makes calculation more complicated with increase of a quantity of partitions. In the act 140 of the embodiment of the present disclosure, when the backlight diffusion parameter lookup table is established, a plurality of sub-tables are established, each sub-table corresponds to one or more light emitting regions affected when only a certain light emitting region is illuminated, and each sub-table includes a plurality of diffusion distances and diffusion brightness corresponding to each diffusion distance, so that a quantity of bits of a diffusion distance stored in the backlight diffusion parameter lookup table may be greatly reduced, thereby reducing hardware requirements for storage.

Each sub-table established in the embodiment of the present disclosure is indexed using a diffusion distance in each light emitting region to replace distances between positions corresponding to a plurality of pixels in each light emitting region and a position where a light emitting region is individually illuminated. For example, assuming that each light emitting region corresponds to 30*30 pixels, when only one light emitting region is illuminated, a total of 10*10 light emitting regions are affected, that is, 5 light emitting regions are affected in one direction. Therefore, a calculated diffusion distance usually changes from 0 to 150 unit lengths, and a calculation process is cumbersome. A diffusion distance in each sub-table established by the present disclosure varies from 0 to 30 unit lengths. In a hardware processor, such as a Field Programmable Gate Array (FPGA), a Digital Signal Processor (DSP), and a Programmable Logic Array (PLA), storage of a calculation result will consume hardware resources, and storage is performed in a binary way. For example, storing a value of 150 requires 8-bit binary hardware space, while storing a value of 30 requires only 5-bit binary hardware space, so the storage resources required by the present disclosure will be greatly reduced.

In some exemplary implementation modes, when only one light emitting region is illuminated, a quantity of affected light emitting regions is 4 y, a quantity of sub-tables is y, and y is a natural number greater than or equal to 1.

In an embodiment of the present disclosure, at least two symmetry axes exist in a profile of a diffusion range of a light emitting region, and according to a symmetry principle, a weight lookup table of only one quarter region of the diffusion range may be used, which not only retains a compatibility for different light types, but also reduces overhead of resources to the greatest extent.

In some exemplary implementation modes, a diffusion distance in each sub-table is represented by a two-dimensional coordinate of a corresponding pixel. In the present disclosure, a plurality of sub-tables are provided and a diffusion distance is replaced by using a two-dimensional coordinate of a pixel in a single partition, which improves operation efficiency and reduces calculation overhead.

In some exemplary implementation modes, diffusion brightness (i.e., a backlight diffusion weight) of a pixel stored in each sub-table is not zero.

Figure 7A:
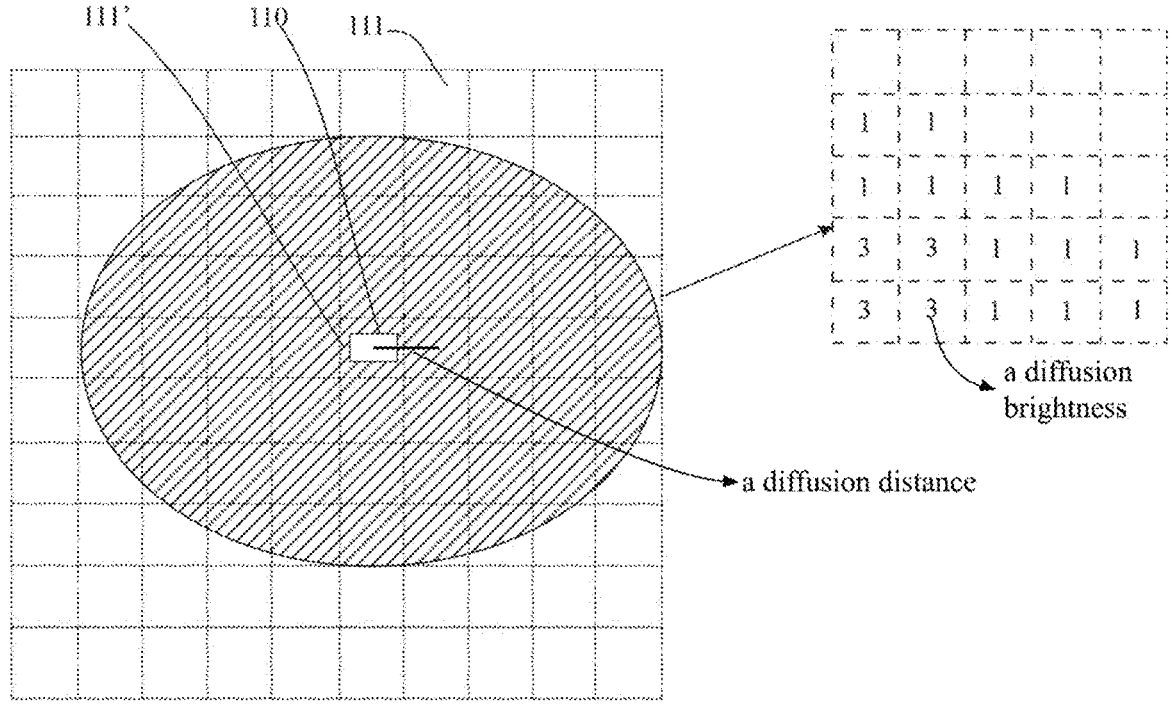
FIG. 7A is a schematic diagram of a data distribution of a single sub-table.

As shown in FIG. 7A, since diffusion brightness of a pixel stored in each sub-table created in the present disclosure is not zero, capacity of the sub-table may be adjusted according to an amount of stored data. At least one first sub-table exists in the plurality of sub-tables, and a quantity of diffusion brightness of pixels stored in the first sub-table is smaller than a quantity of pixels in a pixel region corresponding to the first sub-table, so that a quantity of data stored in the sub-table may be effectively reduced.

In some exemplary implementation modes, a plurality of pixel coordinate bonding points and diffusion brightness corresponding to each pixel coordinate bonding point are included in each sub-table. In the present disclosure, a pixel coordinate bonding point refers to a pre-selected pixel coordinate which needs to store corresponding diffusion brightness, and diffusion brightness of a non-pixel coordinate bonding point is obtained by performing linear interpolation calculation of diffusion brightness corresponding to two pixel coordinate bonding points adjacent to the non-pixel coordinate bonding point.

Figure 7B:
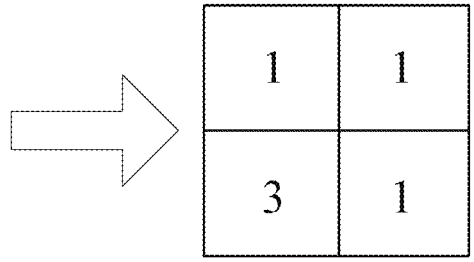
FIG. 7B is a schematic diagram of a principle of simplifying a single sub-table through pixel coordinate bonding points.

As shown in FIG. 7B, assuming that a pixel region corresponding to each light emitting region includes 5*5 pixels, in the related art, a complete lookup table corresponding to the light emitting region (i.e., a lookup table including all pixel coordinates whose diffusion brightness is not zero) needs to store diffusion brightness corresponding to 5*5 pixel coordinates (a complete lookup table corresponding to a light emitting region at an edge of a diffusion range needs to store diffusion brightness which may be less than 5*5). In the present disclosure, a plurality of pixel coordinate bonding points are provided, which may greatly reduce a quantity of diffusion brightness needed to be stored in a sub-table corresponding to each light emitting region. In calculation, diffusion brightness of a pixel except the pixel coordinate bonding points in a light emitting region is obtained by performing linear interpolation calculation of the diffusion brightness of the pixel coordinate bonding points. In the present disclosure further and greatly reduces resource consumption in aspects of hardware media storage and algorithm hardware by using a way of pixel coordinate bonding points instead of a complete lookup table.

In a hardware process of a display panel algorithm, backlight diffusion calculation is a part that consumes the most hardware resources, accounting for about 70% to 80% of a whole chip. Therefore, a design of a backlight diffusion calculation module is very important. In the embodiment of the present disclosure, a plurality of sub-tables are made, and each sub-table stores a plurality of pixel coordinate bonding points and diffusion brightness corresponding to the pixel coordinate bonding points. When a program is running, diffusion brightness data corresponding to each pixel coordinate bonding point may be read directly through computer software or a hardware circuit, and diffusion brightness data between two pixel coordinate bonding points may be calculated through linear interpolation without complicated operation, which not only reduces program calculation overhead, but also reduces a hardware demand for storage, greatly reducing consumption of storage media, improving convenience for data reading and running, and improving running efficiency. Data storage media include various forms of computer readable memories, such as a Random Access Memory (RAM), cache, and a Read Only Memory (ROM).

Figure 8:
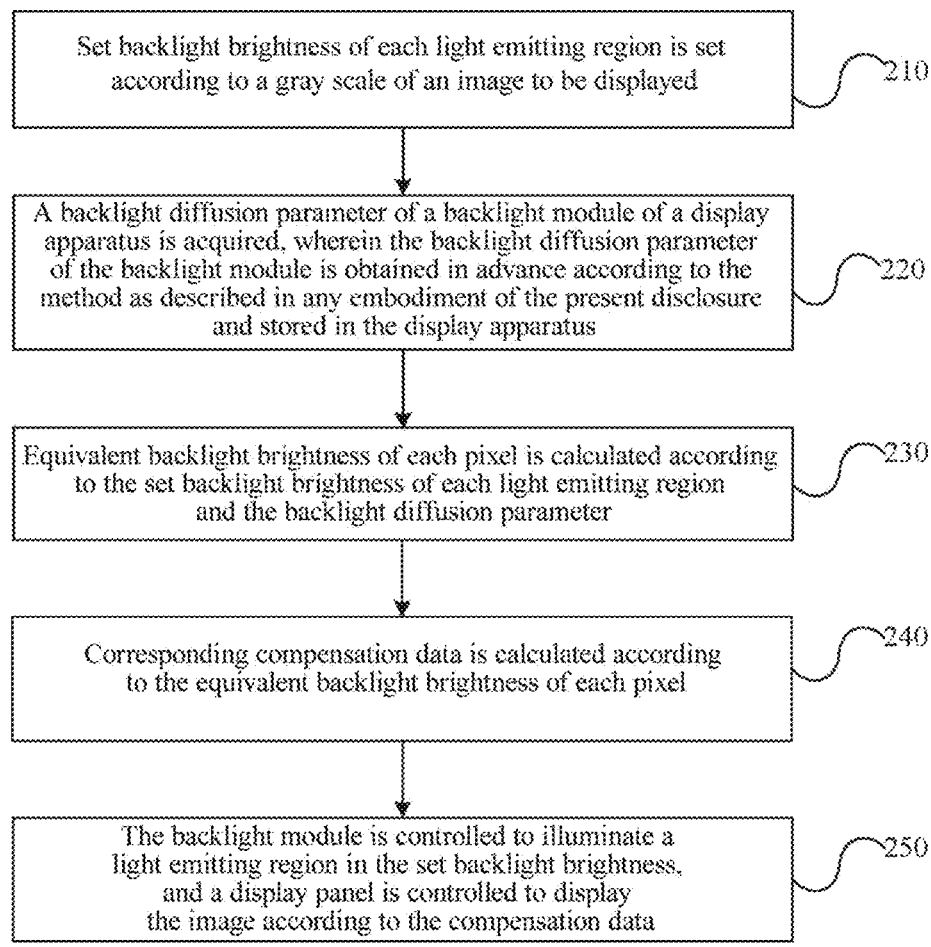
FIG. 8 is a schematic flowchart of a display control method according to an exemplary embodiment of the present disclosure.

An embodiment of the present disclosure also provides a display control method, and FIG. 8 is a schematic flowchart of the display control method according to the embodiment of the present disclosure. Herein the display control method includes following acts.

In act 210, set backlight brightness of each light emitting region is set according to a gray scale of an image to be displayed.

In act 220, a backlight diffusion parameter of a backlight module of a display apparatus is acquired, wherein the backlight diffusion parameter of the backlight module is obtained in advance according to the method as described in any embodiment of the present disclosure and stored in the display apparatus.

In act 230, equivalent backlight brightness of each pixel is calculated according to the set backlight brightness of each light emitting region and the backlight diffusion parameter.

In act 240, corresponding compensation data is calculated according to the equivalent backlight brightness of each pixel.

In act 250, the backlight module is controlled to illuminate a light emitting region in the set backlight brightness, and a display panel is controlled to display the image according to the compensation data.

In some exemplary implementation modes, in the act 210, setting the set backlight brightness of each light emitting region according to the gray scale of the image to be displayed may include setting the set backlight brightness of each light emitting region according to a statistical value of a pixel gray scale corresponding to each light emitting region.

A quantity of gray scales that may be presented in the displayed image is $2^N$, and when N is 8, $2^8=256$ gray scales may be presented. Generally speaking, an adjustable level of backlight brightness cannot reach so many levels, so an approximate brightness level may be selected according to an interval to which a gray scale belongs.

In some exemplary implementation modes, prior to acquiring the backlight diffusion parameter of the backlight module of the display apparatus in the act 220, the backlight diffusion parameter may be stored in a memory of the display apparatus and invoked during display control for implementing various display control methods.

In some exemplary implementation modes, in the act 230, calculating the equivalent backlight brightness of each pixel according to the set backlight brightness of each light emitting region and the backlight diffusion parameter includes: for each pixel, obtaining an equivalent backlight brightness calculation formula of the pixel according to following acts.

All A*B effective light emitting regions affecting brightness of the pixel are determined, wherein A and B are positive integers; diffusion weight data corresponding to the A*B effective light emitting regions is determined according to a distance between the pixel and the A*B effective light emitting regions; total diffusion brightness of the A*B effective light emitting regions in the pixel is calculated according to the diffusion weight data corresponding to the A*B effective light emitting regions and the set backlight brightness; and the total diffusion brightness of the A*B effective light emitting regions in the pixel is taken as the equivalent backlight brightness of the pixel.

In some exemplary implementation modes, when determining all the A*B effective light emitting regions affecting the brightness of the pixel, all the A*B effective light emitting regions affecting the brightness of the pixel may be determined according to a point spread function y=f(x), wherein A and B are positive integers. According to an effective range of the point spread function, an effective light emitting region of each pixel may be obtained by reverse deduction. For example, a center of the pixel may be determined according to a diffusion radius r, and all light emitting regions within the radius r are determined as effective light emitting regions. Herein, the point spread function of the backlight module may be obtained in advance according to the method of the above embodiment and stored in the display apparatus. For example, it may be obtained by testing each model of the display apparatus by a display apparatus manufacturer before leaving a factory and stored in a memory of the display apparatus, and may be invoked when necessary.

In other exemplary implementation modes, the backlight diffusion parameter lookup table includes A*B effective light emitting regions and corresponding diffusion weight data of each pixel. In the present disclosure, the A*B effective light emitting regions and corresponding diffusion weight data of each pixel are stored in the backlight diffusion parameter lookup table and there is no need to recalculate every time, and the equivalent backlight brightness of each pixel is calculated according to the effective light emitting regions and corresponding diffusion weight data, and the set backlight brightness during display control.

In some exemplary implementation modes, for each pixel, a formula for calculating the equivalent backlight brightness may be weight normalized, wherein a weight normalization process includes: calculating a weight sum of A*B effective light emitting regions, and calculating a normalized weight corresponding to each effective light emitting region according to the calculated weight sum.

After that, normalized weights of all effective light emitting regions of each pixel are stored as backlight diffusion parameters, and are directly used for calculating equivalent backlight brightness without recalculating every time.

In some exemplary implementation modes, determining the diffusion weight data corresponding to the A*B effective light emitting regions includes: acquiring weights of (A*B−1) effective light emitting regions except a light emitting region where the pixel is located; calculating a weight sum a of the (A*B−1) effective light emitting regions except the light emitting region where the pixel is located; and calculating a weight b=1−a of the light emitting region where the pixel is located.

Compensation data in a local dynamic dimming technology is obtained based on diffusion backlight, so accuracy of diffusion backlight directly affects an effect of liquid crystal display. After obtaining weight data of the A*B effective light emitting regions, equivalent backlight brightness of each pixel may be calculated according to the weights of the A*B effective light emitting regions and the set backlight brightness. However, due to limited accuracy of a computer, when storing a normalized weight of each effective light emitting region, the computer will perform a rounding or truncation operation. Therefore, if the weight data of the A*B effective light emitting regions are directly obtained, a sum of the weights of the A*B effective light emitting regions may not be equal to 1, which leads to deviation of calculation of the equivalent backlight brightness of the pixel, and then leads to deviation of calculation of the compensation data. In the present disclosure, when determining a weight of a light emitting region where a pixel is located, calculation is performed through a weight sum of the (A*B−1) effective light emitting regions except the light emitting region where the pixel is located. This processing method avoids a need to perform a normalization again, and also avoids an error of weight data of the (A*B) effective light emitting regions due to storage accuracy.

In the act 240, when the equivalent backlight brightness of the pixel is obtained, corresponding compensation calculation may be performed to obtain corresponding compensation data.

In the act 250, the backlight module is controlled to illuminate the light emitting region in the set backlight brightness, and the display panel is controlled to display the image according to the compensation data.

For ease of understanding, operations that may be performed in advance before the dynamic dimming display control are summarized. An overall process from measuring a point spread function of a light emitting region to finally obtaining a diffusion weight parameter is as follows.
  (1) Data acquisition, illumination diffusion data of a plurality of pixels is acquired.
  (2) Data preprocessing, data of a backlight diffusion range and an effective pixel are obtained.
  (3) Point spread function fitting, function fitting is performed according to data of the effective pixel to obtain a point spread function.
  (4) According to the fitted point spread function, a backlight diffusion weight of a pixel is calculated, that is, diffusion weights of all effective light emitting regions of each pixel are calculated.
  (5) The diffusion weights are normalized.
  (6) A final backlight diffusion parameter lookup table is obtained and stored.

In this way, in the act 220, in a process of acquiring the backlight diffusion parameter of the backlight module, effective light emitting regions and normalized weight data of each pixel may be obtained. In the act 230, equivalent backlight brightness of each pixel is calculated according to set backlight brightness of each light emitting region and the backlight diffusion parameter, and a stored effective light emitting region and a normalized weight parameter are directly invoked to calculate equivalent backlight brightness. In this way, the equivalent backlight brightness of each pixel may be quickly obtained through a simple matrix operation, and an operating speed is accelerated.

In a display process, backlight needs to be adjusted for each frame of image (or every few frames of image, depending on a design of a control algorithm). After each backlight adjustment, the equivalent backlight brightness of each pixel needs to be recalculated. Therefore, the operating speed is very important. The A*B effective light emitting regions and corresponding diffusion weight data or normalized weight data are stored and directly invoked in a display control process, which may greatly improve the operating speed.

According to the display control method of the embodiment of the present disclosure, diffusion of a light emitting region is accurately modeled and a diffusion weight of an effective light emitting region corresponding to each pixel is stored, which can conveniently obtain a brightness diffusion coefficient from a light emitting region to a pixel at any distance. It is convenient to accurately and rapidly calculate equivalent backlight of each pixel in a display process, obtain a transition smooth backlight distribution close to actual backlight diffusion brightness, and then obtain corresponding compensation data, so as to achieve a same or even better display effect as full backlight display, which makes an image closer to actual brightness of an original image in a non-low gray scale range, reduce image distortion, and have good image quality, a high contrast ratio, a small distortion rate, and no block or dividing line. In addition, due to reduction of backlight brightness in a relatively dark region in an image, a better contrast ratio may also be obtained as a whole.

An embodiment of the present disclosure also provides a display control apparatus, including a memory and a processor connected to the memory, the memory is configured to store instructions, the processor is configured to perform acts of the display control method according to any embodiment of the present disclosure based on the instructions stored in the memory.

Figure 9:
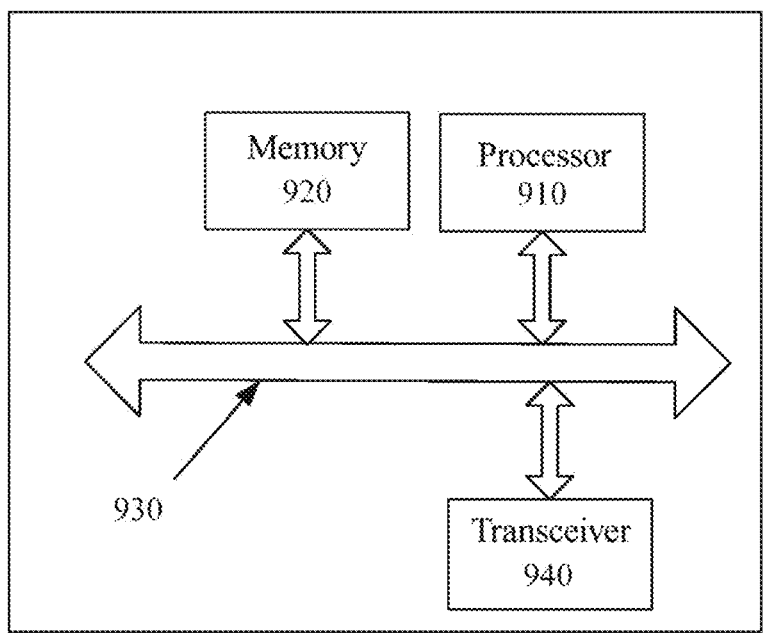
FIG. 9 is a schematic diagram of a structure of a display control apparatus according to an exemplary embodiment of the present disclosure.

As shown in FIG. 9, in an example, a drive module of a display apparatus may include: a processor 910, a memory 920, a bus system 930, and a transceiver 940. Among them, the processor 910, the memory 920, and the transceiver 940 are connected through the bus system 930, the memory 920 is configured to store instructions, and the processor 910 is configured to execute the instructions stored in the memory 920 to control the transceiver 940 to transmit and receive signals. Specifically, the transceiver 940 may receive an image to be displayed under control of the processor 910, and the processor 910 sets set backlight brightness of each light emitting region according to a gray scale of the image to be displayed; a backlight diffusion parameter of a backlight module is acquired, wherein the backlight diffusion parameter of the backlight module is obtained in advance according to the backlight diffusion parameter generation method as described in any embodiment of the present disclosure and stored in the display apparatus; equivalent backlight brightness of each pixel is calculated according to the set backlight brightness of each light emitting region and the backlight diffusion parameter; corresponding compensation data is calculated according to the equivalent backlight brightness of each pixel; and the backlight module is controlled to illuminate a light emitting region in the set backlight brightness, and a display panel is controlled to display the image according to the compensation data.

It should be understood that the processor 910 may be a Central Processing Unit (CPU), or the processor 910 may be another general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, etc. The general-purpose processor may be a microprocessor, or the processor may be any conventional processor, etc.

The memory 920 may include a read only memory and a random access memory, and provides instructions and data to the processor 910. A portion of the memory 920 may further include a non-volatile random access memory. For example, the memory 920 may store information of a device type.

The bus system 930 may include a power bus, a control bus, a status signal bus, or the like in addition to a data bus. However, for clarity of illustration, various buses are all denoted as the bus system 930 in FIG. 9.

In an implementation process, processing performed by a processing device may be completed through an integrated logic circuit of hardware in the processor 910 or instructions in a form of software. That is, acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read only memory or an electrically erasable programmable memory, a register. The storage medium is located in the memory 920, and the processor 910 reads information in the memory 920 and completes the acts of the above method in combination with its hardware. In order to avoid repetition, detailed description is not provided here.

An embodiment of the present disclosure also provides a display apparatus, which includes the display control apparatus as described in any embodiment of the present disclosure, a display panel, and a backlight module.

An embodiment of the present disclosure also provides a computer readable storage medium, having stored a computer program thereon, wherein when the computer program is executed by a processor, the display control method according to any embodiment of the present disclosure is achieved. A method for controlling a display apparatus to display by executing executable instructions is basically the same as the display control method provided in the above embodiments of the present disclosure, and will not be repeated here.

In some possible implementation modes, various aspects of the display control method provided by the present disclosure may also be implemented as a form of a program product, which includes a program code, wherein when the program product runs on a computer device, the program code is used for enabling the computer device to perform acts in the display control method according to various exemplary implementation modes of the present disclosure described above in the specification, for example, the computer device may perform the display control method described in the embodiments of the present disclosure.

For the program product, any combination of one or more readable media may be used. A readable medium may be a readable signal medium or a readable storage medium. The readable storage medium may be, for example, but is not limited to, an electrical, magnetic, optical, electromagnetic, infrared, or semiconductor system, apparatus, or device, or a combination of any of the above. More specific examples (non-exhaustive list) of the readable storage medium include: an electrical connection with one or more wires, a portable disk, a hard disk, a Random Access Memory (RAM), a Read Only Memory (ROM), an Erasable Programmable Read Only Memory (EPROM or flash memory), an optical fiber, a portable Compact Disk Read Only Memory (CD-ROM), an optical storage device, a magnetic storage device, or any suitable combination of the above.

Those of ordinary skills in the art may understand that all or some of acts in the methods disclosed above, systems, functional modules or units in apparatuses may be implemented as software, firmware, hardware, and an appropriate combination thereof. In a hardware implementation mode, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed on a computer readable medium, and the computer readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer readable instruction, a data structure, a program module, or other data). The computer storage medium includes, but is not limited to, a RAM, a ROM, an Electrically Erasable Programmable Read Only Memory (EEPROM), a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be configured to store desired information and may be accessed by a computer. In addition, it is known to those of ordinary skill in the art that the communication medium usually includes a computer readable instruction, a data structure, a program module, or other data in a modulated data signal of, such as, a carrier wave or another transmission mechanism, and may include any information delivery medium.

Although the implementation modes of the present disclosure are disclosed above, contents described are only implementation modes used for ease of understanding of the present disclosure, but not intended to limit the present disclosure. Those skilled in the art may make any modification and change in forms and details of implementation without departing from the spirit and scope of the present disclosure. However, the scope of patent protection of the present disclosure should still be subject to the scope defined in the appended claims.

The invention claimed is:

1. A backlight diffusion parameter generation method, used for a display apparatus comprising a backlight module and a display panel, wherein the backlight module comprises a light emitting plate; wherein the light emitting plate comprises a plurality of light emitting regions, and the display panel comprises a plurality of pixels; the method comprises:
  selecting and measuring illumination diffusion data of at least one light emitting region in the plurality of light emitting regions, wherein the illumination diffusion data comprises brightness data of the plurality of pixels on the display panel and distance data between positions corresponding to the plurality of pixels and a position where an illuminated light emitting region is located when only one of the light emitting regions is illuminated;
  preprocessing the illumination diffusion data to obtain an effective pixel;
  performing function fitting according to data corresponding to a plurality of effective pixels to obtain a point spread function representing a relationship between diffusion brightness and a diffusion distance; and
  storing a backlight diffusion parameter lookup table, wherein the backlight diffusion parameter lookup table comprises a plurality of sub-tables, each sub-table corresponds to one or more light emitting regions affected when only one light emitting region is illuminated, and each sub-table comprises a plurality of diffusion distances and diffusion brightness corresponding to each diffusion distance, and the plurality of diffusion distances in each sub-table vary from 0 to 30 unit lengths.

2. The method according to claim 1, wherein when only one of the light emitting regions is illuminated, a quantity of affected light emitting regions is 4y, a quantity of sub-tables is y, and y is a natural number greater than or equal to 1.

3. The method according to claim 1, wherein a diffusion distance in each of the sub-tables is represented by a two-dimensional coordinate of a corresponding pixel.

4. The method according to claim 1, wherein diffusion brightness stored within each of the sub-tables is not zero.

5. The method according to claim 4, wherein each of the sub-tables comprises a plurality of pixel coordinate bonding points and diffusion brightness corresponding to each pixel coordinate bonding point.

6. A display control method, comprising:
  setting set backlight brightness of each light emitting region according to a gray scale of an image to be displayed;
  acquiring in advance a backlight diffusion parameter of the backlight module of the display apparatus according to the method of claim 1 and storing the backlight diffusion parameter in the display apparatus;
  calculating equivalent backlight brightness of each pixel according to the set backlight brightness of each light emitting region and the backlight diffusion parameter;
  calculating corresponding compensation data according to the equivalent backlight brightness of each pixel; and
  controlling the backlight module to illuminate the light emitting region in the set backlight brightness, and controlling the display panel to display the image according to the compensation data.

7. The method according to claim 6, wherein the calculating the equivalent backlight brightness of each pixel according to the set backlight brightness of each light emitting region and the backlight diffusion parameter comprises:
  determining all A*B effective light emitting regions affecting brightness of the pixel, wherein A and B are positive integers;
  acquiring weights of (A*B−1) effective light emitting regions except a light emitting region where the pixel is located, and calculating a weight sum a of the (A*B−1) effective light emitting regions;
  calculating a weight b=1−a of the light emitting region where the pixel is located;
  calculating total diffusion brightness of the A*B effective light emitting regions in the pixel according to diffusion weight data corresponding to the A*B effective light emitting regions and the set backlight brightness; and
  taking the total diffusion brightness of the A*B effective light emitting regions in the pixel as the equivalent backlight brightness of the pixel.

8. A display control apparatus, comprising a memory and a processor connected to the memory, wherein the memory is configured to store instructions, the processor is configured to perform acts of a display control method according to claim 6 based on the instructions stored in the memory.

9. The display control apparatus according to claim 8, wherein the display control apparatus is included in the display apparatus.

10. A non-transitory computer readable storage medium on which a computer program is stored, wherein when the program is executed by a processor, a display control method according to claim 6 is implemented.

11. A display control method, comprising:
setting set backlight brightness of each light emitting region according to a gray scale of an image to be displayed;
acquiring in advance a backlight diffusion parameter of the backlight module of the display apparatus according to the method of claim 2 and stored storing the backlight diffusion parameter in the display apparatus;
calculating equivalent backlight brightness of each pixel according to the set backlight brightness of each light emitting region and the backlight diffusion parameter;
calculating corresponding compensation data according to the equivalent backlight brightness of each pixel; and
controlling the backlight module to illuminate the light emitting region in the set backlight brightness, and controlling the display panel to display the image according to the compensation data.

12. The method according to claim 11, wherein the calculating the equivalent backlight brightness of each pixel according to the set backlight brightness of each light emitting region and the backlight diffusion parameter comprises:
determining all A*B effective light emitting regions affecting brightness of the pixel, wherein A and B are positive integers;
acquiring weights of (A*B−1) effective light emitting regions except a light emitting region where the pixel is located, and calculating a weight sum a of the (A*B−1) effective light emitting regions;
calculating a weight b=1−a of the light emitting region where the pixel is located;
calculating total diffusion brightness of the A*B effective light emitting regions in the pixel according to diffusion weight data corresponding to the A*B effective light emitting regions and the set backlight brightness; and
taking the total diffusion brightness of the A*B effective light emitting regions in the pixel as the equivalent backlight brightness of the pixel.

13. A display control method, comprising:
setting set backlight brightness of each light emitting region according to a gray scale of an image to be displayed;
acquiring in advance a backlight diffusion parameter of the backlight module of the display apparatus according to the method of claim 3 and storing the backlight diffusion parameter in the display apparatus;
calculating equivalent backlight brightness of each pixel according to the set backlight brightness of each light emitting region and the backlight diffusion parameter;
calculating corresponding compensation data according to the equivalent backlight brightness of each pixel; and
controlling the backlight module to illuminate the light emitting region in the set backlight brightness, and controlling the display panel to display the image according to the compensation data.

14. The method according to claim 13, wherein the calculating the equivalent backlight brightness of each pixel according to the set backlight brightness of each light emitting region and the backlight diffusion parameter comprises:
determining all A*B effective light emitting regions affecting brightness of the pixel, wherein A and B are positive integers;
acquiring weights of (A*B−1) effective light emitting regions except a light emitting region where the pixel is located, and calculating a weight sum a of the (A*B−1) effective light emitting regions;
calculating a weight b=1−a of the light emitting region where the pixel is located;
calculating total diffusion brightness of the A*B effective light emitting regions in the pixel according to diffusion weight data corresponding to the A*B effective light emitting regions and the set backlight brightness; and
taking the total diffusion brightness of the A*B effective light emitting regions in the pixel as the equivalent backlight brightness of the pixel.

15. A display control method, comprising:
setting set backlight brightness of each light emitting region according to a gray scale of an image to be displayed;
acquiring in advance a backlight diffusion parameter of the backlight module of the display apparatus according to the method of claim 4 and storing the backlight diffusion parameter in the display apparatus;
calculating equivalent backlight brightness of each pixel according to the set backlight brightness of each light emitting region and the backlight diffusion parameter;
calculating corresponding compensation data according to the equivalent backlight brightness of each pixel; and
controlling the backlight module to illuminate the light emitting region in the set backlight brightness, and controlling the display panel to display the image according to the compensation data.

16. The method according to claim 15, wherein the calculating the equivalent backlight brightness of each pixel according to the set backlight brightness of each light emitting region and the backlight diffusion parameter comprises:
determining all A*B effective light emitting regions affecting brightness of the pixel, wherein A and B are positive integers;
acquiring weights of (A*B−1) effective light emitting regions except a light emitting region where the pixel is located, and calculating a weight sum a of the (A*B−1) effective light emitting regions;
calculating a weight b=1−a of the light emitting region where the pixel is located;
calculating total diffusion brightness of the A*B effective light emitting regions in the pixel according to diffusion weight data corresponding to the A*B effective light emitting regions and the set backlight brightness; and
taking the total diffusion brightness of the A*B effective light emitting regions in the pixel as the equivalent backlight brightness of the pixel.

17. A display control method, comprising:
setting set backlight brightness of each light emitting region according to a gray scale of an image to be displayed;
acquiring in advance a backlight diffusion parameter of the backlight module of the display apparatus according to the method of claim 5 and storing the backlight diffusion parameter in the display apparatus;

calculating equivalent backlight brightness of each pixel according to the set backlight brightness of each light emitting region and the backlight diffusion parameter;

calculating corresponding compensation data according to the equivalent backlight brightness of each pixel; and controlling the backlight module to illuminate the light emitting region in the set backlight brightness, and controlling the display panel to display the image according to the compensation data.

18. The method according to claim 17, wherein the calculating the equivalent backlight brightness of each pixel according to the set backlight brightness of each light emitting region and the backlight diffusion parameter comprises:

determining all A*B effective light emitting regions affecting brightness of the pixel, wherein A and B are positive integers;

acquiring weights of (A*B−1) effective light emitting regions except a light emitting region where the pixel is located, and calculating a weight sum a of the (A*B−1) effective light emitting regions;

calculating a weight b=1−a of the light emitting region where the pixel is located;

calculating total diffusion brightness of the A*B effective light emitting regions in the pixel according to diffusion weight data corresponding to the A*B effective light emitting regions and the set backlight brightness; and taking the total diffusion brightness of the A*B effective light emitting regions in the pixel as the equivalent backlight brightness of the pixel.

19. A display control apparatus, comprising a memory and a processor connected to the memory, wherein the memory is configured to store instructions, the processor is configured to perform acts of a display control method according to claim 7 based on the instructions stored in the memory.

20. A non-transitory computer readable storage medium on which a computer program is stored, wherein when the program is executed by a processor, a display control method according to claim 7 is implemented.

* * * * *